(12) United States Patent
Thiruvenkadam et al.

(10) Patent No.: US 9,147,258 B2
(45) Date of Patent: Sep. 29, 2015

(54) METHODS AND SYSTEMS FOR SEGMENTATION IN ECHOCARDIOGRAPHY

(71) Applicant: General Electric Company, Schenectady, NY (US)

(72) Inventors: Sheshadri Thiruvenkadam, Bangalore (IN); Navneeth Subamanian, Bangalore (IN); Mithun Das Gupta, Bangalore (IN)

(73) Assignee: General Electric Company, Niskayuna, NY (US)

(*) Notice: Subject to any disclaimer, the term of this patent is extended or adjusted under 35 U.S.C. 154(b) by 235 days.

(21) Appl. No.: 13/777,981

(22) Filed: Feb. 26, 2013

(65) Prior Publication Data
US 2014/0233818 A1 Aug. 21, 2014

Related U.S. Application Data

(60) Provisional application No. 61/766,596, filed on Feb. 19, 2013.

(51) Int. Cl.
*G06K 9/00* (2006.01)
*G06T 7/00* (2006.01)

(52) U.S. Cl.
CPC ............ *G06T 7/0097* (2013.01); *G06T 7/0089* (2013.01); *G06T 7/0012* (2013.01); *G06T 7/0083* (2013.01); *G06T 2207/10016* (2013.01); *G06T 2207/10132* (2013.01); *G06T 2207/20116* (2013.01); *G06T 2207/30048* (2013.01)

(58) Field of Classification Search
None
See application file for complete search history.

(56) References Cited

U.S. PATENT DOCUMENTS

| 5,457,754 | A | * | 10/1995 | Han et al. | 382/128 |
|---|---|---|---|---|---|
| 6,708,055 | B2 | | 3/2004 | Geiser et al. | |
| 6,839,456 | B2 | * | 1/2005 | Touzawa et al. | 382/128 |
| 2008/0317308 | A1 | * | 12/2008 | Wu et al. | 382/128 |
| 2011/0044522 | A1 | * | 2/2011 | Fancourt et al. | 382/131 |
| 2011/0262018 | A1 | * | 10/2011 | Kumar et al. | 382/131 |
| 2011/0319763 | A1 | * | 12/2011 | Subramanian et al. | 600/446 |

OTHER PUBLICATIONS

Corea L et al. Echocardiography and septal thickness Jun. 1987.
Evans, A.N. Nixon et al. Biased motion-adaptive temporal filtering for speckle reduction in echocardiography Aug. 2002.
Xuli Zong et al. Speckle reduction and contrast enhancement of echocardiograms via multiscale nonlinear processing Aug. 2002.
Ledesma-Carbayo, M.J et al. Cardiac ultrasound motion detection by elastic registration exploiting temporal coherence Nov. 2002.
Ledesma-Carbayo, M.J et al. Spatio-temporal nonrigid registration for ultrasound cardiac motion estimation Sep. 2005.
Hassan Moladoust et al. Determination of Instantaneous Interventricular Septum Wall Thickness by Processing Sequential 2D Echocardiographic Images 2007.

(Continued)

*Primary Examiner* — Shervin Nakhjavan
(74) *Attorney, Agent, or Firm* — Seema S. Katragadda

(57) ABSTRACT

Methods and systems for segmentation in echocardiography are provided. One method includes obtaining echocardiographic images and defining a search space within the echocardiographic images using a pair of one-dimensional (1D) profiles. The method also includes using an energy based function constrained by non-local temporal priors within the defined search space to automatically segment a contour of a cardiac structure with the 1D profiles.

18 Claims, 10 Drawing Sheets

(56) References Cited

OTHER PUBLICATIONS

Moladoust H et al. Radial strain assessment of the interventricular septum wall by a new technique in healthy subjects. 2007.

Oktay, A.B. et al. Echocardiographic contour extraction with local and global priors through boosting and level sets Jun. 2009.

Subramanian N et al. Automated interventricular septum thickness measurement from B-mode echocardiograms 2010.

Sten Roar Snare et al. Automated septum thickness measurement—A Kalman filter approach Apr. 2011.

* cited by examiner

METHODS AND SYSTEMS FOR SEGMENTATION IN ECHOCARDIOGRAPHY

CROSS REFERENCE TO RELATED APPLICATIONS

This application claims priority to and the benefit of the filing date of U.S. Provisional Application No. 61/766,596, filed on Feb. 19, 2013, entitled "Methods and Systems for Segmentation in Echocardiography," which is hereby incorporated by reference in its entirety.

BACKGROUND

Different methods for quantitative analysis of three-dimensional (3D) and four-dimensional (4D) echocardiograms are known. With 3D and 4D echocardiography, different image slices may be extracted from acquired volumes, which may be acquired as a series of image frames covering the cardiac cycle.

In 4D echocardiography, for example, a sequence of volumetric images of a patient's heart may be acquired using an ultrasound system. Compared to conventional 2D echocardiography, 4D echocardiography increases the complexity of visualization and analysis of the acquired data. Thus, a high degree of manual interaction often has to be performed to extract clinically useful information. Typical examples of such manual interaction include cropping of volumetric data for visualization, such as for optimal visualization of the cardiac wall. Further, manual placement of regions of interest (ROIs) may be used. Thus, a high level of input from the user may be needed.

For example, the interventricular septum thickness (IVSd) is one screening measurement in echocardiography, as this thickness, along with left ventricle (LV) size, may be used as a screening parameter for septal hypertrophy, and also shows a correlation to 24 hour ambulatory blood pressure. In particular, as cardiac hypertrophy potentially leads to other cardiac complications, the measurement can be used for screening purposes. In general, heart wall and chamber dimensions may be used as screening parameters for detection of cardiac diseases. However, because the measurements are performed manually, inter- and intra-observer variability occurs as a result of observer variability based on experience and expertise.

Automation of the workflow for septum thickness measurement is challenging and known methods may not perform satisfactorily for use in real time. Within the workflow, identifying the septum border is an important and challenging first step. In particular, noise and in-homogeneities induced by near field haze represent challenges for achieving a good segmentation result. These challenges result in the need for algorithms that advance the initialization closer to the septum boundary. However, in some cases, such as where the septum boundary has low contrast resulting in large boundary gaps, the known segmentation methods fail or fail to perform satisfactorily.

Moreover, other approaches, such as region based active contour approaches, also suffer from drawbacks, such as the infeasibility of generating shape atlases for the septum given the large inter-patient shape variability and non-rigid deformation across frames, as well as failure of the segmentation when constraining the width where the septum boundary has low contrast.

BRIEF DESCRIPTION

In one embodiment, a method for automatic segmentation of a cardiac structure is provided. The method includes obtaining echocardiographic images and defining a search space within the echocardiographic images using a pair of one-dimensional (1D) profiles. The method also includes using an energy based function constrained by non-local temporal priors within the defined search space to automatically segment a contour of a cardiac structure with the 1D profiles.

In another embodiment, an ultrasound system is provided that includes an ultrasound probe configured to acquire echocardiographic images and a processor having a segmentation module configured to define a search space within the echocardiographic images using a pair of one-dimensional (1D) profiles and use an energy based function constrained by non-local temporal priors within the defined search space to automatically segment a contour of a cardiac structure with the 1D profiles. The ultrasound system also includes a display configured to display the segmented contour of the cardiac structure.

DETAILED DESCRIPTION

Figure 1:
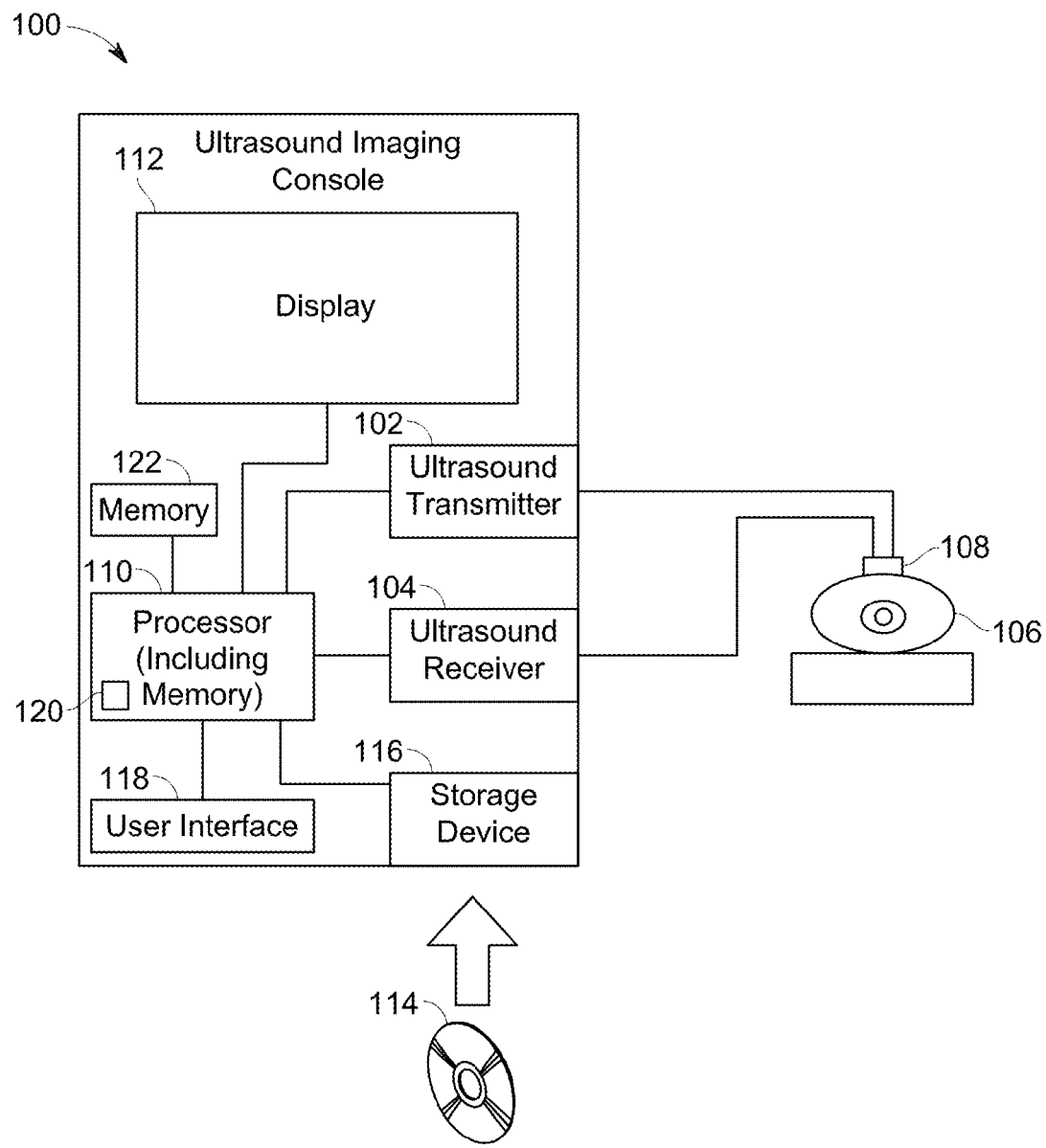
FIG. 1 is a block diagram of an ultrasound imaging system formed in accordance with an embodiment.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

At least one embodiment disclosed herein uses non-local temporal priors (prior solutions) for the segmentation of echocardiography data or echocardiograms, such as echocardiographic images. In particular, various embodiments use ultrasound cardiac data (e.g., three-dimensional (3D) and/or four-dimensional (4D) echocardiograms) for segmentation, including temporal information that encompasses the continuity of the motion of structures, such as the motion of the septum of the heart (being an elastic structure) that is correlated across different locations. A technical effect of at least one embodiment is a more robust process for determining the septum location in the absence of strong contrast information. A technical effect of at least one embodiment is allowing segmentation on different types of images, including images having boundary gaps due to poor image quality.

Various embodiments obtain the correlation information using a temporal penalty. Additionally, the velocity interactions between pixels extend beyond the local areas or neighborhoods. Accordingly, various embodiments may model the non-local interactions to increase the robustness to noise/boundary gaps.

Some embodiments provide a segmentation algorithm for tracking of the septum using ultrasound B-mode echocardiograms that may be used to determine an interventricular septum thickness (IVSd). As used herein, the septum generally refers to a wall of the heart, which in various embodiments is the interventricular septum (IVS or ventricular septum). The IVS is the wall separating the lower chambers (ventricles) of the heart from each other.

In accordance with some segmentation methods described herein, an energy based formulation is minimized and makes use of regional statistics, a shape prior on the septum width and/or a term for the temporal priors. Using the segmentation methods, segmentation or tracking of the septum may be performed that is used for automatic measurement of the septum thickness. For example, various embodiments may simultaneously use texture, shape and motion interactions of the anatomy, such as the heart. It should be noted that although various embodiments are described in connection with the human heart, various embodiments may be used with non-human hearts and also for other anatomy.

FIG. 1 illustrates a block diagram of an ultrasound imaging system 100 that is formed in accordance with an embodiment and that may be used to acquire and process echocardiography or echocardiogram information (e.g., echocardiographic images) to segment the acquired ultrasound data using non-local temporal priors. The ultrasound imaging system 100 includes an ultrasound transmitter 102 and an ultrasound receiver 104 configured to receive reflected ultrasound radiation reflected from a region of interest of an object 106 and to convert received ultrasound radiation into image data. The object 106 may be, for example, a medical patient, and the region of interest may, for example, include the heart of the patient. To emit ultrasound radiation into object 106 and to receive reflected ultrasound radiation therefrom, an ultrasound probe 108 is used to obtain successive frames of image data. The ultrasound imaging system 100 also includes a processor 110 (that includes memory) configured to analyze the image data, and a display 112 configured to show results from the analysis of the image data. The processor 110 may be a module comprising a computational/logic engine (e.g., a microprocessor or CPU) together with memory, not shown separately in FIG. 1. A user interface 118 may be provided to allow the user to input data, select images, adjust and refine image data and imaging parameters, and the like. The user interface 118 may be any known input device, including, but not limited to, a keyboard, a trackball, mouse, touch screen, toggle switches, sliders, and buttons.

The processor 110 may include a segmentation module 120 configured to perform segmentation as described in more detail herein. The segmentation module 120 may be implemented in hardware, software or a combination thereof. Additionally, the segmentation module 120 may form part of the processor 120 or may be coupled thereto.

In some embodiments, a storage device 116 is configured to read instructions from an external medium or media 114 such as CD-ROM, DVD, solid-state device, or other types of machine readable media known in the art. Instructions on medium or media 114 are configured to instruct ultrasound imaging system 100, for example, via the processor 110, to perform one or more methods described herein.

In operation, the ultrasound imaging system 100 uses the ultrasound transmitter 102 to drive an array of transducer elements (e.g., piezoelectric crystals) within the probe 108 to emit pulsed ultrasonic signals into a body or volume. The pulsed ultrasonic signals may be for imaging of a ROI that includes an anatomical structure, such as a heart. The ultrasonic signals are back-scattered from structures in the body, for example, adipose tissue, muscular tissue, blood cells, veins or objects within the body to produce echoes that return to the transducer elements. The echoes are received by the ultrasound receiver 102. The received echoes are provided to a beamformer (not shown) that performs beamforming and outputs an RF signal. The RF signal is then provided to an RF processor or the processor 110 that processes the RF signal. Alternatively, the RF processor may include a complex demodulator (not shown) that demodulates the RF signal to form IQ data pairs representative of the echo signals. The RF or IQ signal data may then be provided directly to a memory for storage (e.g., temporary storage).

The processor 110 may be configured to process the acquired ultrasound information (e.g., RF signal data or IQ data pairs) and prepare frames of ultrasound information for display. The processor 110 in various embodiments is adapted to perform one or more processing operations according to a plurality of selectable ultrasound modalities on the acquired ultrasound information. Acquired ultrasound information may be processed in real-time during a diagnostic session as the echo signals are received. Additionally or alternatively, the ultrasound information may be stored temporarily in memory during a diagnostic session and processed in less than real-time in a live or off-line operation. The processed frames of acquired ultrasound information that are not scheduled to be displayed immediately may be stored in a memory 122. The memory 122 may comprise any known data storage medium, for example, a permanent storage medium, removable storage medium, etc.

The processor 120 is communicatively coupled to the user interface 118 that is configured to receive inputs from the operator to control operation of the probe 108. The display 112 may automatically display, for example, a 2D, 3D, or 4D ultrasound data set stored in the memory 122 or currently being acquired. The memory 122 may store 3D data sets of the ultrasound data, where such 3D data sets are accessed to present 2D and 3D images. For example, a 3D ultrasound data set may be mapped into the corresponding memory 122, as well as one or more reference planes. The processing of the data, including the data sets, may be based in part on operator inputs, for example, user selections received at the user interface 118.

It should be noted that in some embodiments, the ultrasound data may constitute IQ data pairs that represent the real and imaginary components associated with each data sample. The IQ data pairs may be provided to one or more image-processing modules (not shown) of the processor 120, for example, a color-flow module, an acoustic radiation force imaging (ARFI) module, a B-mode module, a spectral Doppler module, an acoustic streaming module, a tissue Doppler module, a C-scan module, and an elastography module. Other modules may be included, such as an M-mode module, power Doppler module, harmonic tissue strain imaging, among others. However, embodiments described herein are not limited to processing IQ data pairs. For example, processing may be done with RF data and/or using other methods.

Each of the image-processing modules may be configured to process the IQ data pairs in a corresponding manner to generate color-flow data, ARFI data, B-mode data, spectral Doppler data, acoustic streaming data, tissue Doppler data, C-scan data, elastography data, among others, all of which may be stored in a memory temporarily before subsequent processing. The image data may be stored, for example, as sets of vector data values, where each set defines an individual ultrasound image frame. The vector data values are generally organized based on the polar coordinate system. A scan converter module (not shown) may access and obtain from the memory 122 the image data associated with an image frame and convert the image data to Cartesian coordinates to generate an ultrasound image formatted for display.

Some embodiments are not implemented using an ultrasound imaging system. For example, a subset of the system shown in FIG. 1 may be used for some embodiments. For example, a computer comprising a processor, memory, and display is suitable for implementing many embodiments. In some embodiments the computer may be sufficient to provide a suitable method that is available for transferring image data from an imaging system, such as ultrasound imaging system 100 of FIG. 1. In other embodiments the transferring of the image data may be accomplished in real-time. Furthermore, the imaging system need not be an ultrasound imaging system or a medical imaging system, provided a sequence of image frames can be obtained. In cases in which at least one embodiment is implemented in an ultrasound imaging system 100, the physical size of the imaging system is not limited to a particular configuration. For example, the ultrasound imaging system 100 may be provided in a console configuration, a portable configuration, or a hand-held configuration.

Various embodiments provide septum segmentation using non-local temporal priors. In particular, some embodiments use a motion parameter from a previous segmentation that includes non-local points. In some embodiments, a pair of one-dimensional (1D) curves is used with an energy function to determine piecewise smooth regions of the curves. Thus, various embodiments define a search space over a pair of smooth 1D profiles instead of using a 2D active contour approach. By using various embodiments, the representation enables access to regional statistics in and around the septum, as well as model interaction between the top and bottom septum boundaries.

Figure 2:
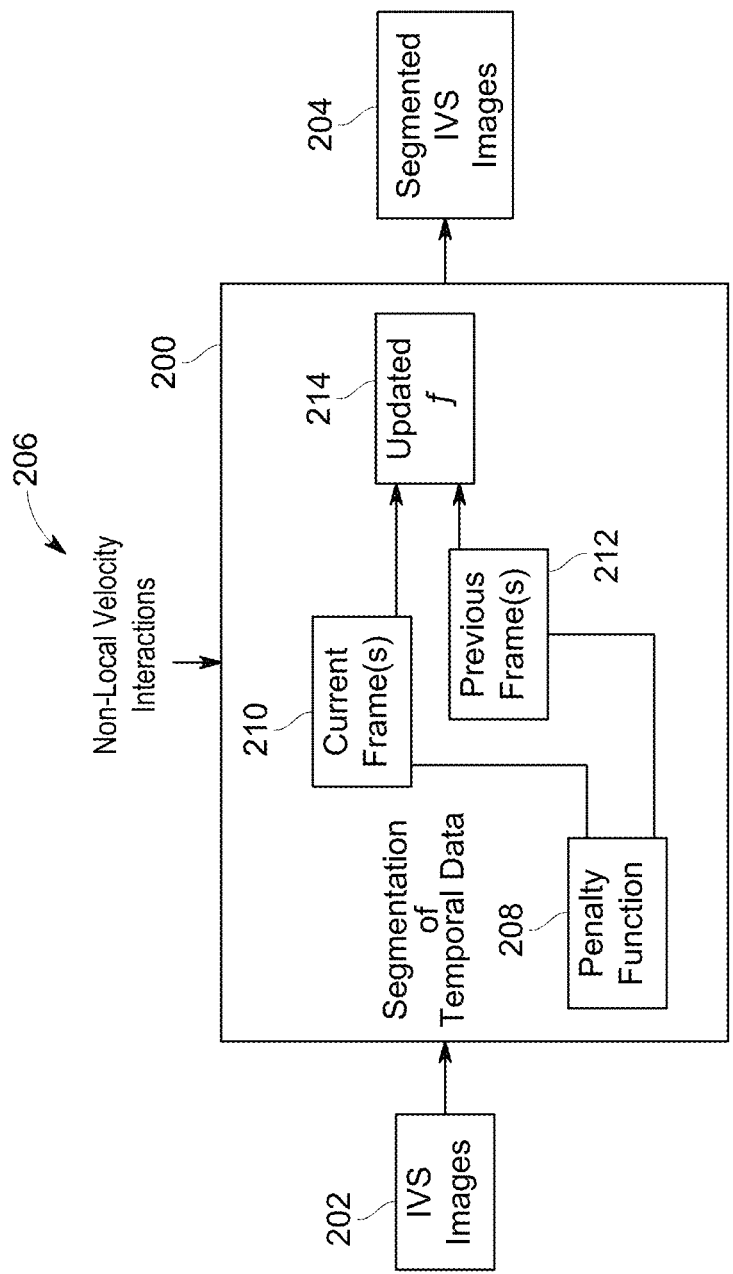
FIG. 2 is a block diagram illustrating segmentation using temporal data in accordance with various embodiments.

For example, as shown in FIG. 2, segmentation of non-local temporal data, for example, segmentation of ultrasound echocardiography or echocardiogram data may be performed using non-local temporal priors. FIG. 2 illustrates a segmentation process or algorithm 200 that may be implemented in hardware, software or a combination thereof. The segmentation process 200 in various embodiments receives IVS images 202 and segments the IVS images 204 to identify the IVS.

In particular, the method uses non-local velocity interactions 206, specifically, non-local velocity interactions of pixels while segmenting temporal data from the IVS images as described in more detail herein. The segmentation process 200 uses the non-local velocity interactions 206 for applying a penalty function 208 to a pair of 1D profiles, which are 1D functions that represent the IVS boundaries. The penalty function 208 penalizes the spatial smoothness of the acceleration of the 1D profiles instead of direct penalties on the 1D profiles or the velocities of the 1D profiles.

In particular, the segmentation process 200 uses the penalty function 208 and defines an energy function, which in one embodiment defines the current energy as follows:

$$E(f,g)=D(f,g)+W(f,g)+S(f)+S(g) \qquad \text{Eq. 1}$$

where, D is a data term, W is a width term and S is a smoothness term.

Accordingly, Equation 1 defines an energy function that includes septum shape constraints in the illustrated embodiment that comprise smoothness and width constraints. It should be noted that $f$ and $g$ correspond to different IVS boundaries (or any moving anatomical structure of interest). It also should be noted that Equation 1 may be used for other anatomical structures, such as other moving anatomical structures of interest, which in some embodiments includes cardiac structures, such as the posterior wall or the left ventricle.

In various embodiments, the IVS boundaries are represented as two separate one dimensional profiles. The IVS boundary that is proximal to the mitral valve is referred to as the near septum boundary, and is represented as a one dimensional profile $f(x)$. The IVS boundary that is distal to the mitral valve is referred to as the far septum boundary, and is represented as a one dimensional profile $g(x)$.

Using the EL for the non-local penalty for the Gaussian w, results in the following:

$$(f-2f^{n-1}+f^{n-2})-w*(f-2f^{n-1}+f^{n-2}) \qquad \text{Eq. 2}$$

In terms of velocity, Equation 2 may be defined as follows:

$$v-w*v=v^{n-1}-w*v^{n-1} \qquad \text{Eq. 3}$$

Figure 3:
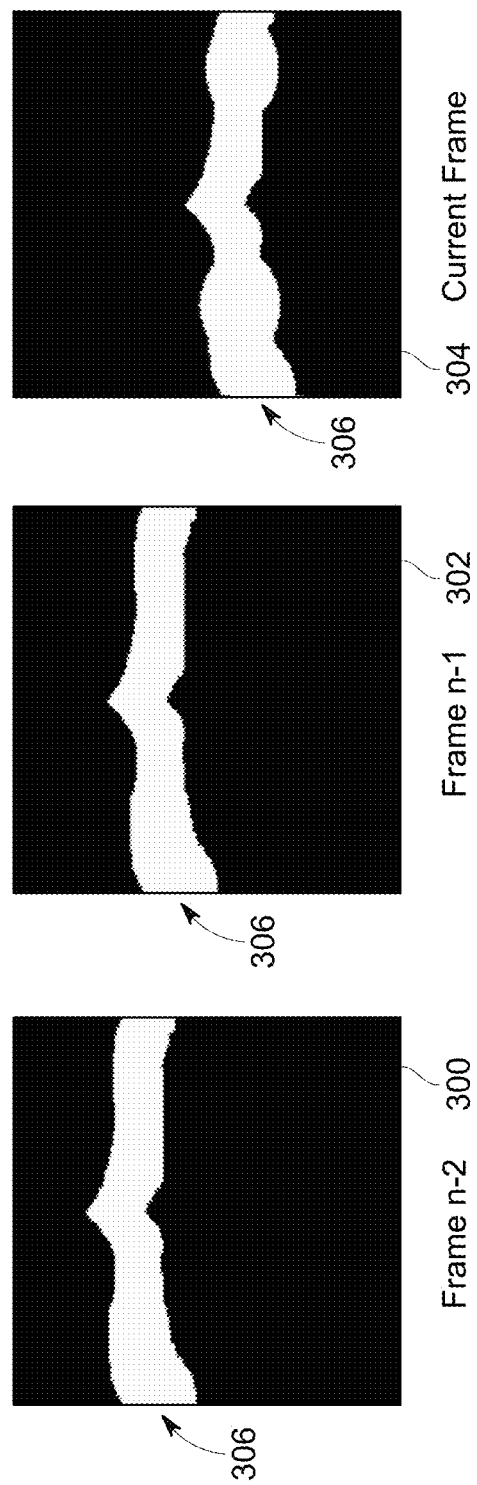
FIG. 3 are images illustrating interventricular septum (IVS) segmentation in accordance with various embodiments.

Thus, the segmentation process 200 uses information from one or more current frames 210 (e.g., ultrasound image frames) and one or more previous frames 212 from non-local neighbor (e.g., adjacent) pixels or voxels, defined by w, to update the function $f$ (e.g., generate an updated function $f$ 214). It should be noted that in some embodiments, the non-Gaussian w from the previous frame may be selected to improve the choice of a neighbor candidate to update $f$. For example, FIG. 3 illustrates graphically a portion of a segmentation, in particular, one iteration of the segmentation process 200 in accordance with various embodiments. In the illustrated embodiment, the segmentation process 200 uses segmented profiles $f,g$ at n−2,n−1 represented by the image frames 300 and 302, respectively, to segment a current image frame 304. It should be noted that this segmentation may be performed in the presence of noise and/or gaps in the image frames 300 and 302. As can be seen, the outline or contour of the IVS 306 is localized and more defined in the current frame 304 than in the previous frames 300 and 302.

Figure 4:
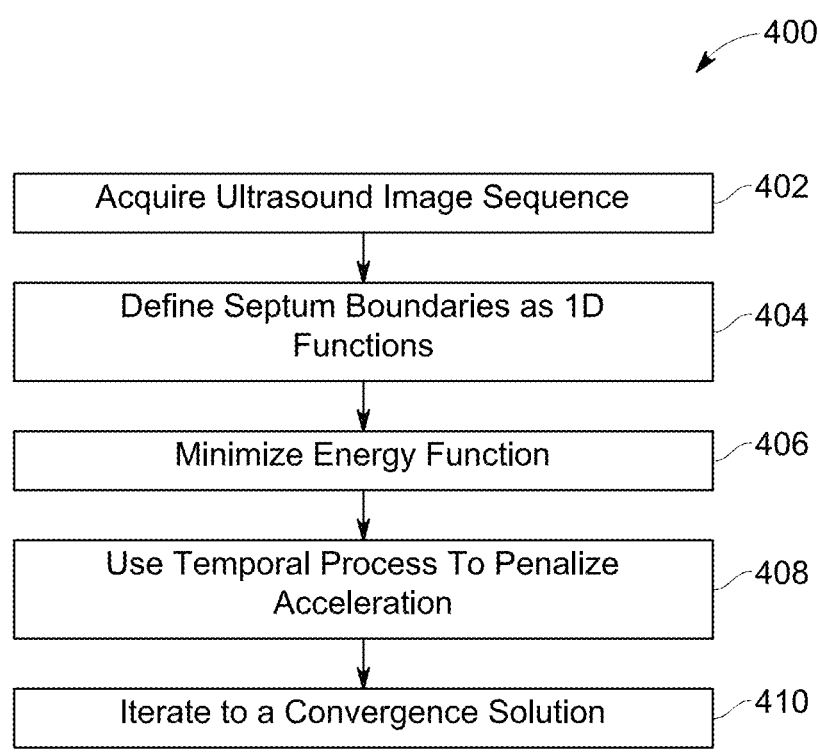
FIG. 4 is a flowchart of a method for segmentation in accordance with various embodiments.

In accordance with various embodiments, a method 400 as illustrated in FIG. 4 for segmentation of an anatomical structure is provided, such as segmentation of a cardiac structure, which in the illustrated embodiment is IVS segmentation. In general, the method 400 includes performing segmentation using non-local points within the images and motion parameter information from previous segmentation iterations or steps. In particular, temporal constraints are introduced to the segmentation cost function and the acceleration of boundary points is constrained to be similar in a non-local neighborhood around each boundary location. With respect to initializing the 1D contours for the segmentation technique, in various embodiments, initializing the septum boundary includes using physiological cues. For example, one process includes a routine based on non-local (NL)-means de-noising and Markov Random Field (MRF) based clustering.

Specifically, the method 400 includes acquiring ultrasound image sequences at 402. For example, a plurality of frames of ultrasound data may be acquired using the ultrasound system 100 shown in FIG. 1. In various embodiments, the image sequence(s) include one or more sequences of ultrasound images of an internal anatomical structure, such as a heart. The images acquired at 402 are ultrasound images of the internal anatomical structure that allow visualization of one or different structures (e.g., valves) of the heart. For example, one or more different views of the heart may be acquired.

Figure 5:
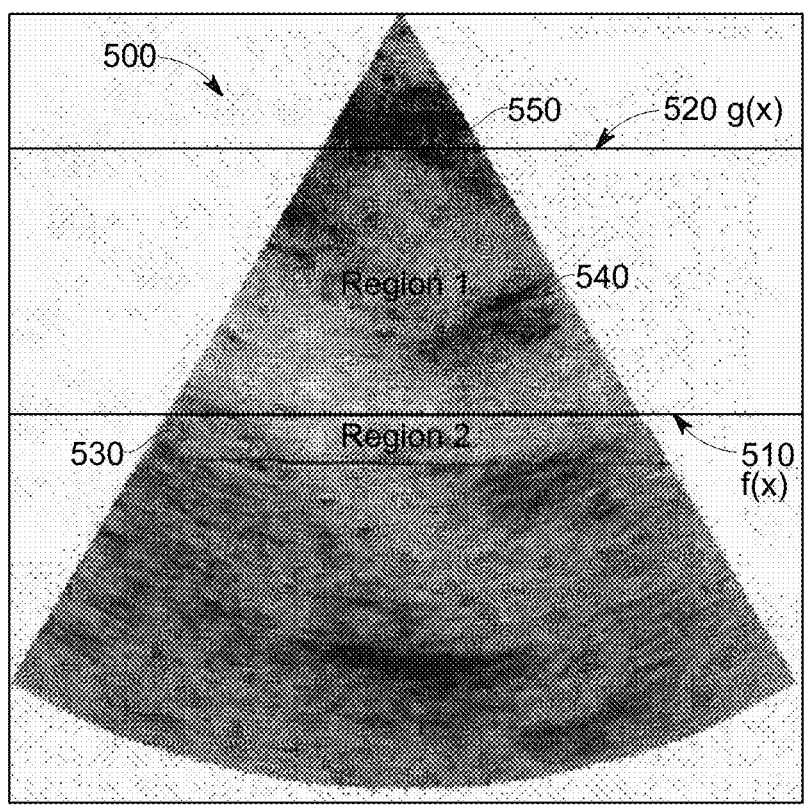
FIG. 5 is an image illustrating initial boundaries for IVS segmentation.

The method 400 includes defining septum boundaries at 404. For example, FIG. 5, which is a Parasternal Long Axis (PLAX) view ultrasound image 500 of the IVS, illustrates initialization of two 1D functions to represent IVS boundaries. It should be noted that in various embodiments, a plurality of cardiac image loops (e.g., three cardiac loops) are acquired, wherein one loop is defined as the end-diastolic frame to the next end-diastolic frame. In particular, the initialization of the two 1D profiles representing the IVS boundaries, is illustrated in FIG. 5 wherein the near septum boundary is represented as f(x) 510. Similarly, the far septum boundary is represented as g(x) 520. The initial 1D profiles, illustrated as straight lines define three regions, in particular, Region 1 540, Region 2 530 and Region 3 550. The line markings depicting for example, the boundaries of the Region 2 530 and the Region 3 550, are for illustration only and not the actual regions necessarily used in computation by various embodiments. The Region 1 540 represents the septum region that is between the near septum boundary 520 and the far septum boundary 510. The Region 2 530 represents the area below the near septum boundary 520. The Region 3 550 represents the area above the far septum boundary 510.

Figure 6:
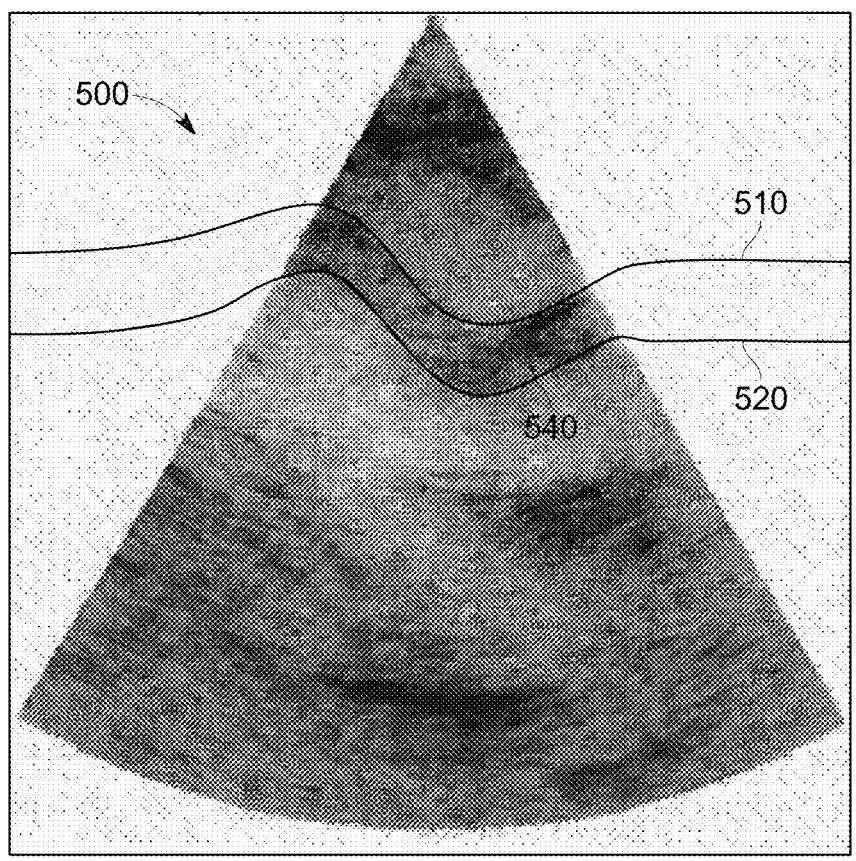
FIG. 6 is an image illustrating boundaries for an IVS after segmentation in accordance with various embodiments.

Using various embodiments, upon convergence of the energy function, the near and far septum boundaries are defined such that the lines more clearly follow the contour of the IVS as illustrated in FIG. 6.

More particularly, and referring again to the method 400, at 404, a 1D active contour process using non-local temporal priors is used. For example, an energy based formulation with a search space of pairs of smooth 1D profiles (representing the top and bottom boundaries of the septum) are used as described herein. This representation allows access to regional statistics in and around the septum, and model interactions between the top and bottom septum boundaries. Further, the simplified representation increases the speed of convergence allowing for real time tracking in various embodiments. In some embodiments, as described herein, temporal cues are incorporated into the process or framework to improve robustness to noise, gaps, and large motion.

For an image defined as:

$$I:\Omega \rightarrow R, \Omega=[a,b]\times[c,d] \qquad \text{Eq. 4}$$

two smooth 1D functions are selected as follows, the profiles of which represent the top and bottom parts of the septum:

$$g,f:[a,b]\rightarrow[c,d] \qquad \text{Eq. 5}$$

In various embodiments, the septum region between the 1D profiled of $f$ and g are denoted as $R^s$. The neighborhood or adjacent region above the septum is denoted as $R^{up}$, which is between the profiles of g and g+$\Delta$, where $\Delta$ is a defined interval. Similarly, the neighborhood or adjacent region below the septum is denoted as $R^{dn}$, which is between the profiles of $f-\Delta$ and $f$; where $\Delta$ is a defined interval. It should be noted that a piecewise constant assumption of intensity is made in and around the neighborhood of the septum (e.g., the region around the septum within a define number of pixels) in various embodiments. Thus, (a,b), which is defined as follows:

$$(a, b) = \bigcup_{i=1}^{K} (a_i, b_i) \qquad \text{Eq. 6}$$

is divided into K disjoint intervals and a determination or search is performed for $f,g$ that results in homogeneous distributions in regions $R_i^{up}$ defined as follows:

$$R_i^{up} \cap ([a_i, b_i]\times[c, d]), R_i^{dn} = R^{dn} \cap ([a_i, b_i]\times[c, d]) \qquad \text{Eq. 7}$$

and $$R_i^s = R^s \cap ([a_i, b_i]\times[c, d])$$

The method 400 then includes in various embodiments minimizing an energy function at 406, which may include minimizing the function within a predetermined tolerance. In particular, in various embodiments, the following energy function is minimized over the space of smooth 1D functions $f,g: [a,b]\rightarrow[c,d]$ and mean statistics $\mu^{up}, \mu^s, \mu^{dn}$, as follows:

$$E_{frm}(f, g, \mu^{up}, \mu^s, \mu^{dn}) = \qquad \text{Eq. 8}$$

$$\sum_{i=1}^{K}\left[\int_{R_i^s}(I-\mu_i^s)^2\,dy\,dx + \int_{R_i^{up}}(I-\mu_i^{up})^2\,dy\,dx + \int_{R_i^{dn}}(I-\mu_i^{dn})^2\,dy\,dx\right] + \lambda_{width}\int_a^b(f+w-g)^2\,dx +$$

$$\lambda_{smooth}\int_a^b\left(\sqrt{1+(f')^2}+\sqrt{1+(g')^2}\right)dx$$

It should be noted that the data term drives $f,g$ to take piecewise constant values in each of $R_i^s, R_i^{up}, R_i^{dn}$. The smoothness terms for $f$ and g are governed by the parameter $\lambda_{smooth}$ (0.08). The width term constrains the width of $R^s$ to be close to the expected septum width (w) and is balanced by $\lambda_{width}$ (~1.0 cm). It should be noted that in most cases, because of the strong contrast between the septum and blood pool, the bottom boundary $f$ of the septum is reliably segmented and the width term drives the top boundary g out of local minima closer to the actual boundary. From this point, the contrast close to the septum boundary takes over and drives the segmentation. In low contrast cases, it would be expected that the evolution is dominated by the smoothness and width terms and be drawn to arbitrary minima.

In various embodiments, the above energy is modified or augmented with temporal priors computed from previous image frames. The septum being an elastic structure exhibits motion that is correlated across different locations, which is captured through temporal priors resulting in robust prediction of the septum in the absence of strong contrast. Also, given the large shape variations and complex non-rigid motion of the septum, the velocity/acceleration is modeled using previous frames. Thus, in various embodiments, temporal priors are used to penalize acceleration at 408. In particular, if $f^{n-2}$, $f^{n-1}$, $f^n$ are the profiles at frames n−2, n−1, n, the velocity $V^n = f^n - f^{n-1}$ may be penalized using the following:

$$\int_a^b \left(\frac{dV^n}{dx}\right)^2 dx \qquad \text{Eq. 9}$$

or the acceleration $A^n = F^{n-2} - 2F^{n-1}$ may be penalized using the following:

$$\int_a^b \left(\frac{dA^n}{dx}\right)^2 dx \qquad \text{Eq. 10}$$

In various embodiments, the non-local penalty for acceleration is defined by the following:

$$\int_a^b \int_a^b w(x,y)(A^n(x) - A^n(y))^2 dx dy \qquad \text{Eq. 11}$$

where w is a weight function for the pair (x,y).

It should be noted that the selection of non-local priors is physically intuitive in that velocity interaction between pixels extend beyond local neighborhoods and various embodiments model the non-local interactions.

The Euler Lagrange equations of the above acceleration penalty is $A^n - w*A^n = 0$ or in terms of velocity $V^n - w*V^n = V^{n-1} - w*V^{n-1}$. Thus, the velocity at each point on the profile $f$ is updated using relative velocities in the previous frame and velocities of non-local neighboring points. As for the selection of w, for simplicity, various embodiments use $w(x, y) = G_\sigma(|x-y|)$, thus the above equations involve only convolutions and are faster to compute. Alternatively, in some embodiments, the intensity/contrast is considered in dependent terms for w to down-select points to learn relative velocities. It should be noted that the motion prior is local wherein motion models at neighboring control points do not interact with each other. Thus, if a control point falls in a poor contrast/signal dropout location, for a few frames, the segmentation will drift. In various embodiments, Equation 8 is modified to include the temporal term.

In particular, for each frame n, the acceleration is defined as $A^n = f^{n-2} - 2f^{n-1}$ and $B^n = g^{n-2} - 2g^{n-1} + g^n$. Then, various embodiments minimize:

$$E_{temp}^n = E_{frm} + \lambda_T \int_a^b \int_a^b w(x,y)((A^n(x) - A^n(y))^2 + (B^n(x) - B^n(y))^2) dx dy \qquad \text{Eq. 12}$$

Accordingly, given profiles from previous time points $f^j$, $g^j$, wherein j=n−2, n−1, then $E_{frm}$ is minimized using descent on the Euler Lagrange equations for Equation 12 using an explicit finite difference scheme. Accordingly, the method 400 includes iterating to a convergence solution at 410.

Figure 7:
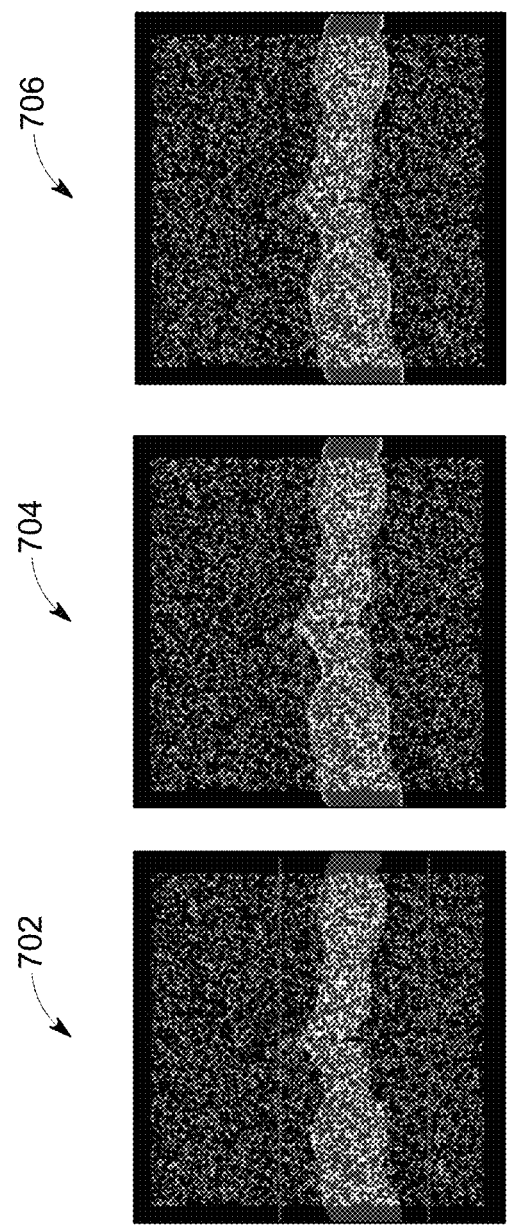
FIG. 7 are images illustrating segmentation without temporal priors and segmentation with temporal priors in accordance with various embodiments.

Thus, referring again to FIG. 3, various embodiments segment the current frame 304 from two clean previous frames 300 and 302. For example, as shown in FIG. 7, illustrating simulated segmentation results in accordance with various embodiments, the contour lines 712 in the image 702 show the initial estimate or guess for the IVS, which illustrates noisy ultrasound data. The results of the segmentation without temporal information are shown in the image 704 by the contour lines 714 and the results of the segmentation using non-local temporal priors in accordance with various embodiments are shown in the image 706 by the contour lines 716. As can be seen, the contour lines 716 converge to a more true representation of the IVS in the image 706.

Figure 8:
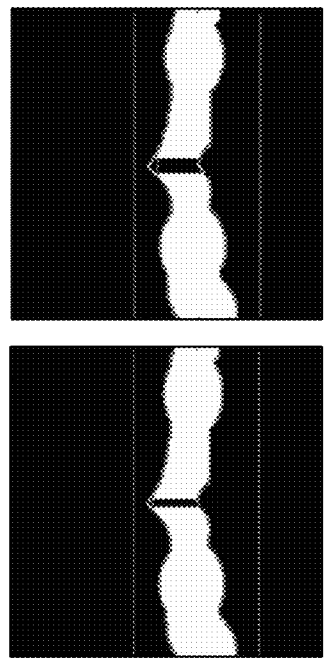
FIG. 8 illustrates images with a data gap showing segmentation without temporal priors.
Figure 9:
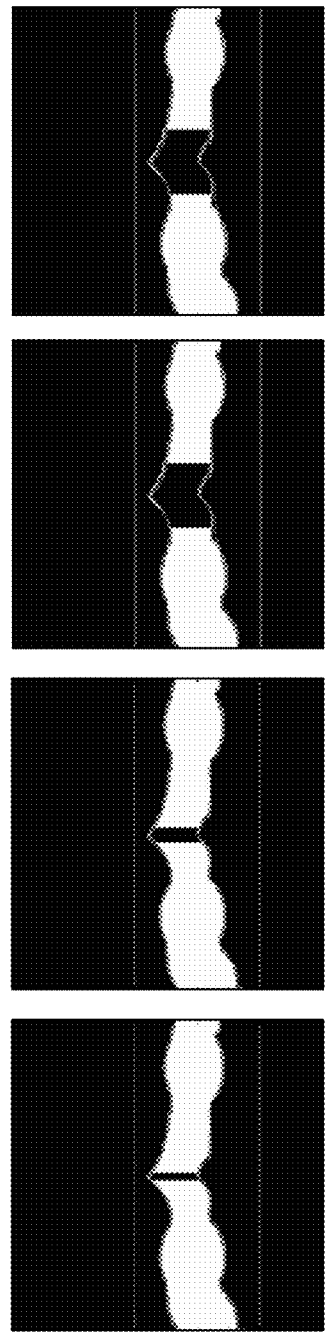
FIG. 9 illustrates images with a data gap showing segmentation with temporal priors in accordance with various embodiments.

Additionally, and for example, the images 802 and 804 of FIG. 8 illustrate simulated segmentation results without temporal priors and the images 902, 904, 906 and 908 of FIG. 9 illustrate simulated segmentation results using non-local temporal priors in accordance with various embodiments, both illustrating gaps in the data. As can be seen, in the images 802 and 804 the kink or point in the lower and upper boundaries is lost and completed with straight lines because of the smoothness term. However, in FIGS. 902, 904, 906 and 908, even with an increasing size of the gap, the kink or point is segmented because at the location with poor contrast, gap or high noise, a non-local neighbor where the contrast is possibly good, directly contributes to the update at the location using relative velocities from previous frames. It should be noted that the images in FIGS. 3, 7, 8 and 9 are simulated results.

With respect to the initialization of the boundaries, the initial contour should be positioned close to the final contour to provide the proper convergence to a solution. In various embodiments, to perform automatic segmentation, including automatic initialization (although manual initialization may be provided in some embodiments by a user drawing an initial contour line) for large patient populations, initialization is driven by physiological cues such that patient variability is captured. For example, the left ventricle (LV) blood pool is an "anechoic" region (no oscillating sources therein) and hence appears completely dark or black when imaged by ultrasound.

Accordingly, in various embodiments, the LV blood pool is detected to infer an estimate for the lower boundary of the septum and initialize the curves. In one embodiment, the first step in this process includes a de-noising algorithm using non-local means and the second step is an MRF based clustering technique to find the maximum width of the blood pool. Once the blood pool is identified, the septum is the immediately adjacent to or neighboring the blood pool towards the ultrasound probe position. This relative position knowledge is used to initialize an active contour method for segmentation.

For example, in one embodiment a neighborhood based non-local smoothing process is performed. For non-local means based filtering, the de-noised value at location x is a mean of the values of all points within the image domain whose Gaussian neighborhood is similar to the neighborhood of x. Accordingly, given a discrete noisy image $v = \{v(i)|i \in I\}$, the estimated value NL(v)(i) is computed as a weighted average of all the pixels in the image I, given by the following:

$$NL(v)(i) = \Sigma_{j \in I} w(i,j) v(i) \qquad \text{Eq. 13}$$

where the weights w(i,j) quantify the similarity between the pixels i and j and satisfy the conditions $0 \leq w(i,j) \leq 1$ and $\Sigma_j w(1,j) = 1$.

To decouple the similarity term from the spatial distance term, the following weighting function is used in various embodiments:

$$w(i, j) = \frac{1}{Z_i} e^{-\frac{sim(1,j)}{\sigma^2}} \qquad \text{Eq. 14}$$

where $Z_i$ is a normalization term such that the weights sum to 1 and parameter h controls the spatial decay of the exponential function.

Moreover, defining a window around pixel i as $N_i$, the similarity between the pixel i and j is defined as the Gaussian weighted similarity of the windows centered at i and j, respectively, given by:

$$sim(i, j) = \sum_k e^{-\frac{(N_i(k) - N_j(k))^2}{\sigma^2}} \qquad \text{Eq. 15}$$

In some embodiments, a Markov Random Fields (MRFs) based clustering technique is used to project the scanned pixels into a finite label space {L:|L|<<255} which is the maximum pixel range for 8 bit image data. The label space may be defined differently for other images having different numbers of bits. In various embodiments, the observation field Y is fixed and is assumed to be non-interacting. The label field X is evolved with iterations minimizing the following cost function:

$$E(L) = \sum_{p \in \chi} D_p(L_p) + \sum_{q \in N_p} V_{p,q}(L_p, L_q) \qquad \text{Eq. 16}$$

where $N_p$ represents the neighborhood for a particular node p.

It should be noted that when reference is made herein to neighborhood or neighbors, this generally refers to image pixels or voxels within a defined or predetermined distance of a particular pixel or voxel.

The MRF model balances the two cost terms in Equation 16 to generate the possible label for the target node. The first term constrains the label to be close to the observation. If the cluster center intensities are pre-specified, then this term can be evaluated as $I(p)-C_i$ over all labels $i=\{1, 2, \ldots, L\}$, wherein I(p) is the pixel intensity at location p. In some embodiments, and for example, |L|=5. However, other values may be used.

Figure 12:
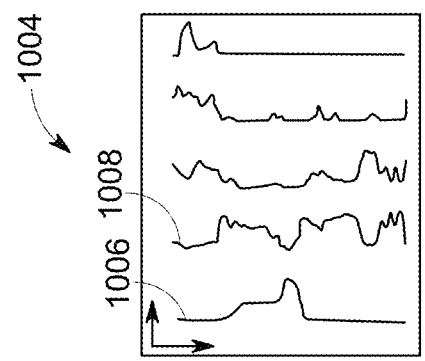
FIG. 12 illustrates histograms for individual label classes in accordance with various embodiments.
Figure 11:
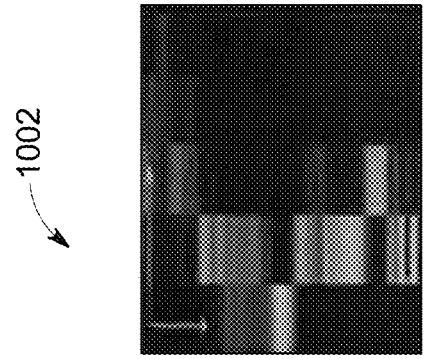
FIG. 11 is an image illustrating a label histogram in accordance with various embodiments.
Figure 10:
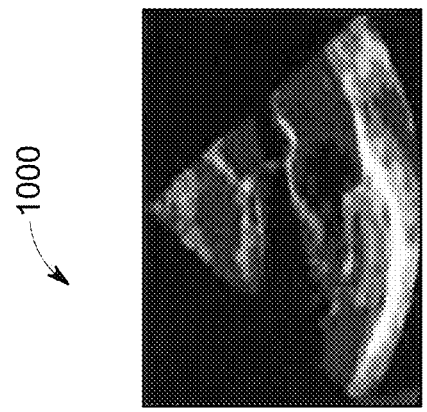
FIG. 10 is an image illustrating Markov Random Fields based pixel clusters in accordance with various embodiments.

Thus, the non-local-means filtering and clustering results in an image where the blood pool is one of darkest clusters in the MRF based pixel clusters image 1000 shown in FIG. 10. The radial histogram 1002 of the pixels with bins centered at the probe location is computed as illustrated in FIG. 11. This essentially leads to counting pixels radially for each label class and results in a 1D curve with as many points as the image depth for each bin. To identify the LV blood pool, the two darkest clusters represented by the histograms 1006 and 1008 in the histogram of FIG. 12 for individual label classes are considered. The initialization estimate is then a radial curve at the maximal bin index corresponding to the blood pool cluster.

In various embodiments, for cardiac segmentation and tracking, the process is performed real-time or near real-time with a computation time of about 0.1 seconds/frame on a 2.6 GHz processor with 2 GB of RAM.

Figure 13:
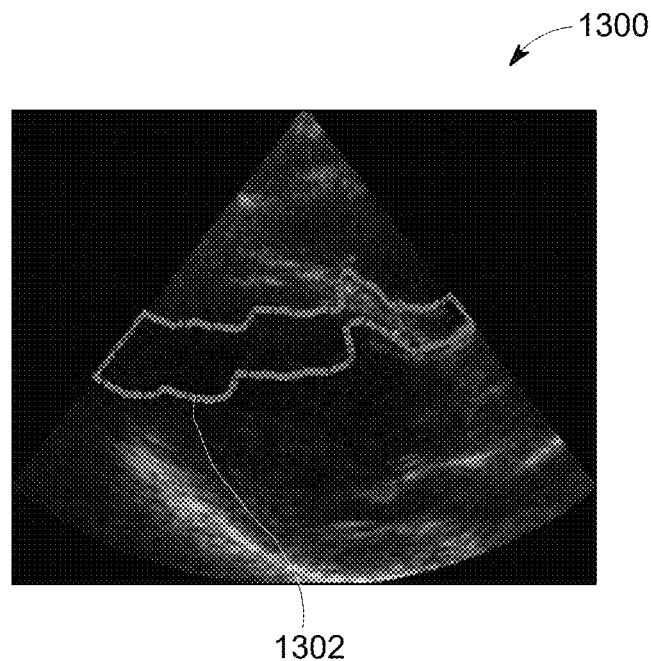
FIG. 13 is an image illustrating IVS segmentation without temporal priors.
Figure 14:
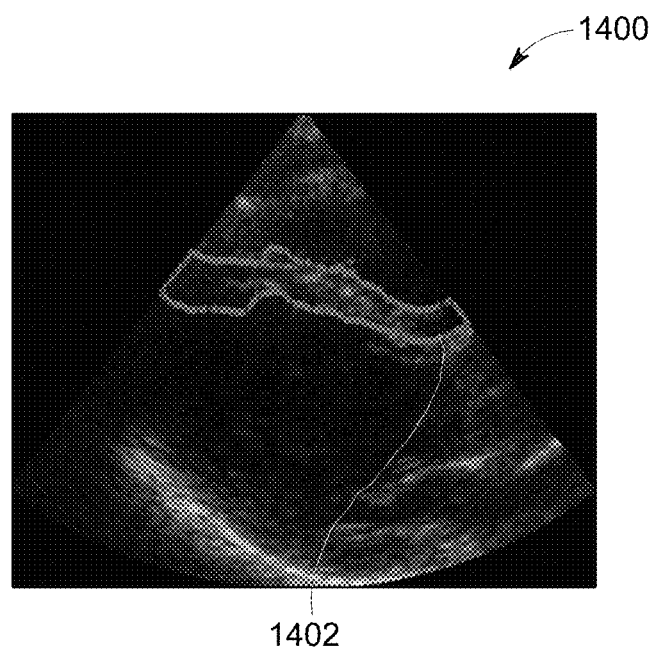
FIG. 14 is an image illustrating IVS segmentation with temporal priors in accordance with various embodiments.

Accordingly, various embodiments provide an automated or automatic method or process for cardiac segmentation that is robust to image noise, haze and cardiac motion typical in ultrasound. In some embodiments, 1D curve evolution based on regional statistics and constrained by temporal priors may be used for segmentation of rapidly moving cardiac structures. Additionally, various embodiments provide automated or automatic initialization to improve or enhance convergence of active contours. For example, FIG. 13 illustrates an ultrasound image 1300 with an IVS contour illustrated by the line 1302 segmented without using temporal priors. FIG. 14 illustrates an ultrasound image 1400 with an IVS contour illustrated by the line 1402 segmented using various embodiments described herein. As can be seen, the contour line 1402 is a more accurate segmentation of the IVS than the contour line 1302.

It should be noted that variations and modifications are contemplated. For example, various embodiments may be used to segment and track other cardiac structures, such as the posterior wall and the LV cavity. As other variations, the acceleration may be limited using $d/dx\, f_{tt}=0$ to allow motion of the form $f(x,t)=h(t)+p(x)+q(x)$, wherein q(x) is the profile shape at t=0. In still other variations, the non-linear motion may be provided only in the vertical direction with horizontal motion of the form $f(x,t)=q(x+p(x,t))$ even for linear p penalized by the acceleration term. In yet other variations, w(x,y) may be selected by weighing x around y wherein good contrast in the previous frame is determined or identified.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and/or non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for automatic segmentation of a cardiac structure, comprising:
    obtaining echocardiographic images;
    defining a search space within the echocardiographic images using a pair of one-dimensional (1D) profiles; and
    using an energy based function constrained by non-local temporal priors within the defined search space to automatically segment a contour of the cardiac structure with the 1D profiles, wherein using the energy based function comprises penalizing a spatial smoothness of the acceleration of the 1D profiles.

2. The method of claim 1, wherein using the energy based function comprises using regional statistics.

3. The method of claim 1, wherein the cardiac structure is an interventricular septum (IVS) and further comprising using a shape prior on IVS width.

4. The method of claim 1, wherein the non-local temporal priors comprise non-local velocity interactions.

5. The method of claim 1, wherein using the energy based function comprises using current and previous frames of echocardiographic images to update the 1D profiles.

6. The method of claim 1, wherein the non-local temporal priors comprise motion parameters from a previous segmentation iteration.

7. The method of claim 1, wherein using the energy based function comprises using non-local temporal cues.

8. The method of claim 1, wherein defining the search space comprises using a non-local means based de-noising filtering.

9. The method of claim 1, wherein defining the search space comprises using Markov Random Fields based clustering.

10. The method of claim 1, wherein the echocardiographic images comprise a plurality of B-mode image sequences of a heart.

11. The method of claim 1, wherein using the energy based function comprises minimizing the following function over the defined search space:

$$E_{frm}(f, g, \mu^{up}, \mu^s, \mu^{dn}) =$$
$$\sum_{i=1}^{K} \left[ \int_{R_i^s} (I - \mu_i^s)^2 \, dydx + \int_{R_i^{up}} (I - \mu_i^{up})^2 \, dydx + \int_{R_i^{dn}} (I - \mu_i^{dn}) \, dydx \right] +$$
$$\lambda_{width} \int_a^b (f + w - g)^2 \, dx + \lambda_{smooth} \int_a^b \left( \sqrt{1 + (f')^2} + \sqrt{1 + (g')^2} \right) dx$$

where I is the echocardiographic images, f and g are the boundaries of the cardiac structure, w is the width of the cardiac structure and μ is a mean statistic.

12. The method of claim 11, wherein the function includes a temporal term and is minimized to:

$$E_{temp}^n = E_{frm} + \lambda_T \int_a^b \int_a^b w(x,y)((A^n(x) - A^n(y))^2 + (B^n(x) - B^n(y))^2) dxdy$$

wherein an acceleration is defined as An=fn−2−2fn−1 and Bn=gn−2−2gn−1+gn, and w is the width of the cardiac structure.

13. A non-transitory computer readable storage medium for segmentation of a cardiac structure using a processor, the non-transitory computer readable storage medium including instructions to command the processor to:
    obtain echocardiographic images;
    define a search space within the echocardiographic images using a pair of one-dimensional (1D) profiles; and
    use an energy based function constrained by non-local temporal priors within the defined search space to automatically segment a contour of the cardiac structure with the 1D profiles, wherein the instructions command the processor to penalize a spatial smoothness of the acceleration of the 1D profiles in the energy based function.

14. The non-transitory computer readable storage medium of claim 13, wherein the cardiac structure is an interventricular septum (IVS) and the instructions command the processor to include at least one of regional statics, a shape prior on IVS width or non-local temporal cues in the energy based function.

15. The non-transitory computer readable storage medium of claim 13, wherein the instructions command the processor to use at least one of a non-local means based de-noising filtering or Markov Random Fields based clustering when defining the search space.

16. An ultrasound system comprising:
   an ultrasound probe configured to acquire echocardiographic images;
   a processor having a segmentation module configured to define a search space within the echocardiographic images using a pair of one-dimensional (1D) profiles and use an energy based function constrained by non-local temporal priors within the defined search space to automatically segment a contour of a cardiac structure with the 1D profiles, wherein the processor is configured to penalize a spatial smoothness of the acceleration of the 1D profiles in the energy based function; and
   a display configured to display the segmented contour of the cardiac structure.

17. The ultrasound system of claim 16, wherein the cardiac structure is an interventricular septum (IVS) and the processor is further configured to include at least one of regional statics, a shape prior on IVS width or non-local temporal cues in the energy based function.

18. The ultrasound system of claim 16, wherein the processor is configured to use at least one of a non-local means based de-noising filtering or Markov Random Fields based clustering when defining the search space.

* * * * *